United States Patent Office 3,702,355
Patented Nov. 7, 1972

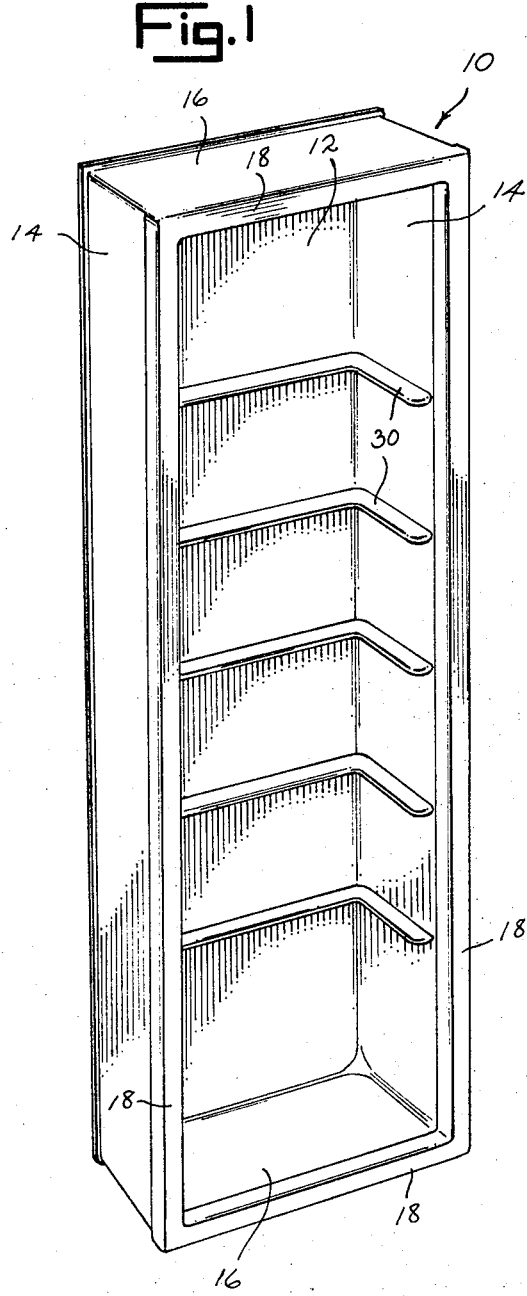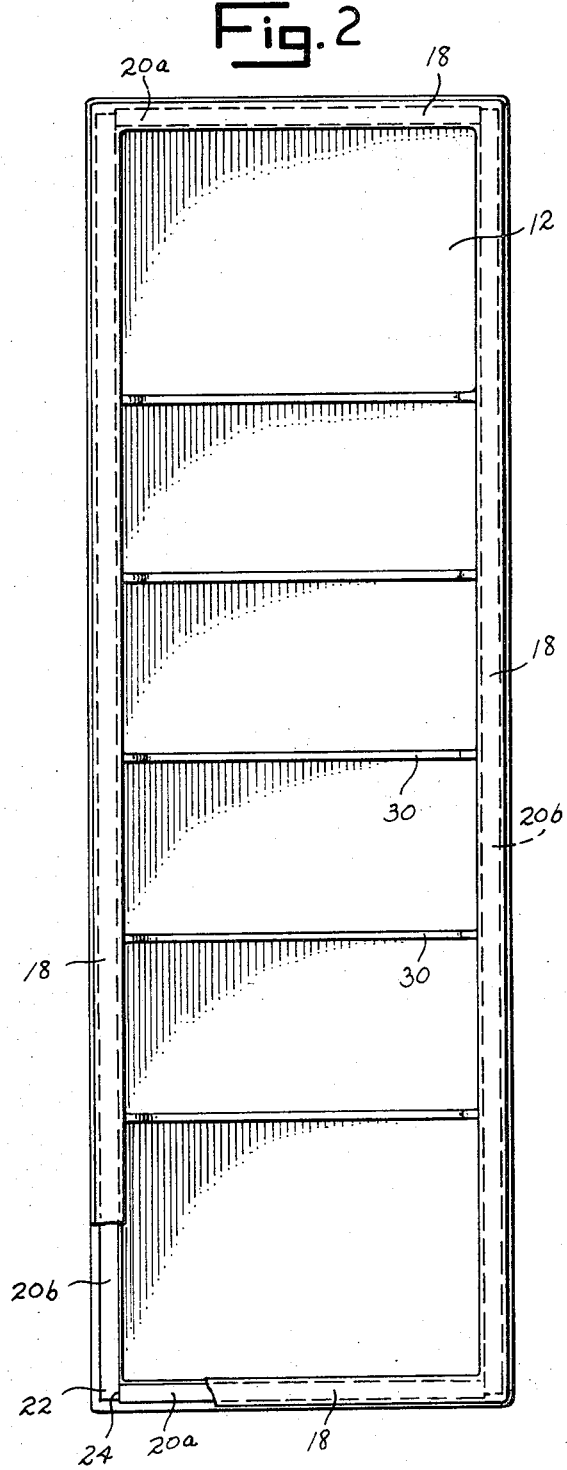

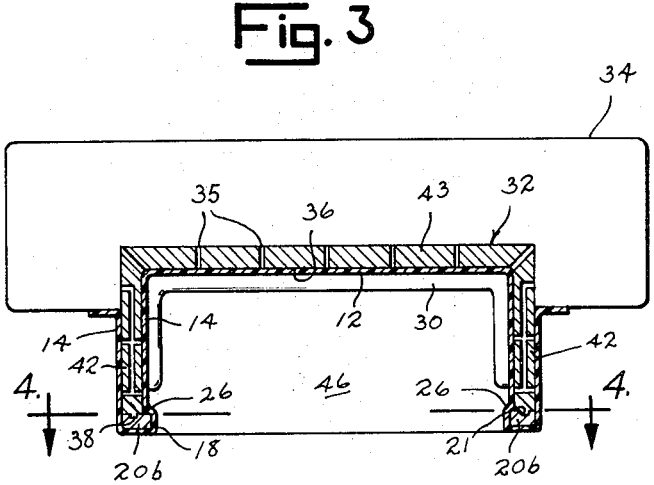
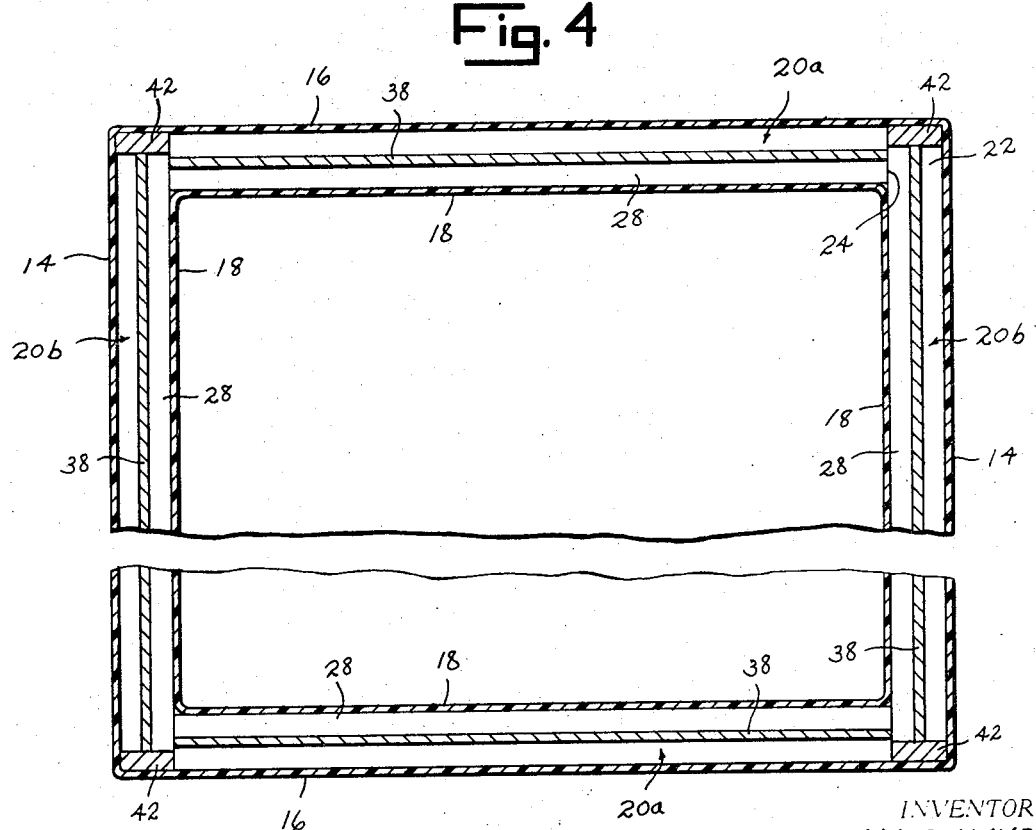

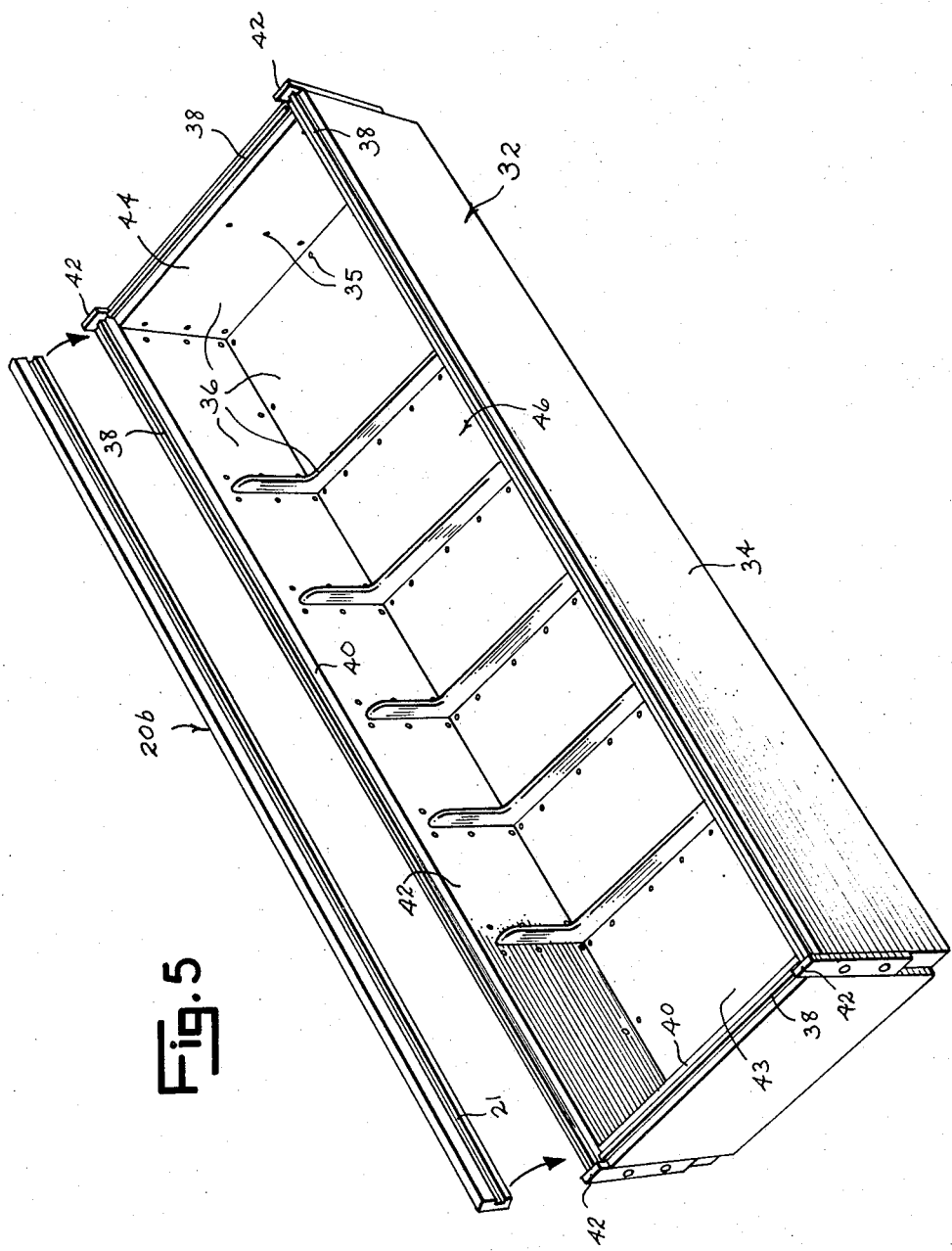

3,702,355
METHOD OF FORMING A MOLDED ARTICLE OF MANUFACTURE WITH STRENGTHENING MEMBERS FORMED THEREIN
William G. Hayden, Elkhart, Ind., assignor to Chemcraft Incorporated, Elkhart, Ind.
Filed Sept. 16, 1970, Ser. No. 72,689
Int. Cl. B29c 17/04, 3/02
U.S. Cl. 264—92                          3 Claims

ABSTRACT OF THE DISCLOSURE

An article of manufacture formed of molded sheet material which carries a plurality of article strengthening members. The strengthening members constitute a removable part of the mold during forming of the article and are retained by the formed sheet material upon separation of the material from the permanent part of the mold. The article strengthening members are not interconnected and are adapted for movement relative to each other after the formed sheet material has been separated from the mold.

SUMMARY OF THE INVENTION

This invention relates to a method of vacuum forming an article of manufacture, such as a cabinet, from sheet material.

In vacuum forming certain products, such as cabinets, it has been found advantageous to strengthen the molded sheet material with a rigid frame member. The frame member may constitute a removable part of the mold and in which case it becomes a part of the formed product or article when the sheet material is separated from the mold. When so utilizing a frame member of one-piece rigid construction, the sheet material after heating and forming will shrink upon the frame member and either experience tearing or deformation or cause deformation of the frame member.

In this invention, instead of a one-piece frame member being carried by the formed material, a plurality of article strengthening members which are not rigidly interconnected and which are allowed to move relative to each other when the formed material has been removed from the mold are utilized to strengthen the material. This relative movement between strengthening members significantly reduces the tendency for the molded product to warp, distort or tear. Additionally, it has been found that, as the formed sheet material is permitted to cool and set while still on the mold, internal stresses are produced within the material which after the material has been removed from the mold and in conjunction with the frictional resistance between the strengthening members and formed material cause a slight bowing or similar distortion of the product. Due to the fact that the strengthening members are not interconnected, the molded product can be either manually or mechanically manipulated and flexed so as to cause relative movement between the strengthening members and the formed sheet material which serves to correct and to restore the product to its intended shape.

Accordingly, it is an object of this invention to provide a method of vacuum forming an article of manufacture from moldable sheet material in which the article includes a plurality of individual strengthening members.

It is another object of this invention to provide a method of vacuum forming a product of high strength from moldable sheet material.

Still another object of this invention is to provide a method of vacuum forming an article of manufacture from moldable sheet material in which such article experiences only minimal distortion during its manufacture.

Another object of this invention is to provide a method of making an article of manufacture from sheet material and including a plurality of unconnected strengthening members integrally formed therein.

Another object of this invention is to provide a method of making an article of manufacture of formed plastic sheet material which is of high strength and of economical construction.

Further objects of this invention will become apparent upon a reading of the invention's description.

BRIEF DESCRIPTION OF THE DRAWINGS

FIG. 1 is a perspective view of a cabinet formed in accordance with the method of this invention.

FIG. 2 is a front view of the cabinet of FIG. 1 with portions thereof broken away for purposes of illustration.

FIG. 3 is a cross sectional view of the cabinet in FIG. 1 positioned upon its mold during the forming of the cabinet.

FIG. 4 is a sectional view taken along line 4—4 of FIG. 3 in fragmentary form.

FIG. 5 is a perspective view of the mold used in forming the cabinet of FIG. 1.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

A cabinet 10 has been chosen as the illustrated embodiment of this invention. Cabinet 10 includes a back wall 12, side walls 14 and end walls 16. The outer margins of side walls 14 and end walls 16 define channel parts 18 which receive elongated rigid strengthening members or braces 20a and 20b. The braces 20a extend along end walls 16 and are preferably positioned between the braces 20b which extend along side walls 14. The end portion 22 of each brace 20b overlaps a portion of end face 24 of the adjacent brace 20a. Braces 20a and 20b preferably lie in substantially the same plane with each channel part 18 including a flange portion 26 which overlaps a portion of the inner face 28 of the brace therein and which serves to retain the brace within the channel part.

Back wall 12 and side walls 14 of cabinet 10 have inwardly projecting ribs 30 formed therein which serve as support members for shelves (not shown) positioned within the cabinet. The back, end and side walls of cabinet 10 are preferably formed of a thermoplastic material, such as polystyrene or acrylonitrile butadiene styrene. Braces 20a and 20b may be of a wood, metal or some other rigid material. One or more doors (not shown) may be secured to the vertical channel parts 18 of cabinet 10 by having the hinges thereof anchored by suitable screw means inserted through the channel parts and turned into braces 20b.

A method of forming cabinet 10 will now be described. A suitable forming mold 32 is provided. Associated with mold 32 is a vacuum box 34. A plurality of small passages 35 extend through mold 32 from vacuum box 34 and open at the forming faces 36 of the mold. A vacuum pump (not shown) is connected to vacuum box 34 and, when actuated, causes the thermoplastic material draped over the top of mold 32 to be drawn against mold forming faces 36. The vacuum mold thus far described is of standard construction and its method of operation is well known in the vacuum forming art.

Mold 32 includes sides 42, ends 44, and base 43 which cooperate to define a mold cavity 46. Mold 32 includes ribs 38 or similar anchoring means, such as dowel pins, which extend along the front end faces 40 of the sides 42 and ends 44 of the mold. Braces 20a and 20b each have a longitudinal slot 21 formed therein which enables the braces to be mounted over mold ribs 38 as illustrated in FIG. 5. The width of slots 21 may slightly exceed the width of ribs 38 to allow slight lateral movement of the braces during cooling of the formed sheet material thereover. Braces 20a and 20b extend outwardly over the inner faces of mold sides 42 and ends 44 so as to define lips under which flanges 26 of the cabinet are formed during the forming process. Referring to FIG. 4, it is to be noted that braces 20b do not extend the full length of the mold but instead abut shims or stops 42 which are permanent parts of the mold.

First braces 20a and 20b are positioned over ribs 38 and mounted to mold 32 as shown in FIGS. 4 and 5. The mold mounted braces, while perhaps contacting one another, are separate and not connected. Ribs 38 of mold 32, in cooperation with stops 42 thereof, serve to limit movement of braces 20a and 20b during the forming process, but will not prevent the braces from being separated from the mold after cabinet 10 has been formed. After the braces have been placed on mold 32, a sheet of thermoplastic material having a length and width sufficient to cover the mold is heated until it is pliable enough to assume a mold conforming shape when drawn by the vacuum against the forming faces 36 of the mold. This may be accomplished when utilizing thermoplastic sheet material of an acrylonitrile butadiene styrene composition, which is 43½ inches wide, 60 inches long, and .135 inches thick, by first mounting the sheet material in a frame which circumferentially anchors the sheet material along its extreme marginal edges. The material is then placed within an oven at a temperature between 350° to 400° F. and heated for approximately two minutes, or until the sheet material assumes a temperature between 220° to 240° F. In utilizing sheet material of the composition and size above described, a 220° to 240° F. material temperature is reached when the material experiences a one-foot drape which is defined as the maximum dip of the material in the center thereof while positioned in the frame and supported horizontally within the oven.

The heated sheet of thermoplastic material is then taken out of the oven and placed over the mold and rested upon braces 20a and 20b so as to enclose the face of mold cavity 46. A vacuum of about 20 to 25 inches of mercury is created by vacuum box 34 within the mold cavity which causes the heated sheet material to be drawn into conforming engagement with the forming faces 36 of mold 32 and around braces 20a and 20b. The formed sheet material is then permitted to cool until it takes a set, which is at approximately 180° F. for the specific material above described. The formed sheet material may be allowed to set by normal radiant cooling at room temperature or by spraying the mold and the material with a coolant, such as an air and water mixture. Once the formed material takes a set, the material and braces 20a and 20b are then separated as a unit from mold 32 and the formed product allowed to cool to room temperature. There is preferably no fixed bond formed between the contacting interfaces of the formed material and braces.

Once the formed product is removed from the mold, a certain degree of shrinkage takes place as the formed sheet material continues to cool. During this shrinkage of material, the braces 20a and 20b move relative to each other and thus reduce the tendency for the material to distort or tear. The spaces occupied by stops 42 of the mold at the ends of braces 20b are substantially reduced and in some cases entirely eliminated due to material shrinkage after the formed material is removed from the mold and allowed to cool. Without stops 42 to provide for spaces between the sheet material and the ends of braces 20b during forming, subsequent shrinkage of the formed material would cause a protrusion in the material at each end of brace 20b, thus detracting from the appearance of the finished product. It has also been found that there is a tendency for the formed product to slightly bow or deform after it is removed from the mold. This bowing or deformation is believed to be attributed to stresses which are set up within the formed sheet material as it cools and takes a set upon the mold. Due to the fact that braces 20a and 20b are not connected and that the formed material is not bonded to the braces, the formed product can be flexed or manipulated by hand or by mechanical means after removal from the mold so as to cause a shifting of the braces relative to the cabinet channel parts 18 and thus straighten and correct any deformation or bowing of the product.

As indicated in the above description, the strengthening members or braces utilized in this invention form a removable part of the mold which, after forming of the sheet material, become a part of the formed product. By not connecting the strengthening members, such members may shift relative to each other as the molded sheet material from which the product is formed cools. By selectively choosing a material for the strengthening members which will not fixedly adhere to the molded sheet material, any bowing or distorting of the material during the forming and cooling thereof can be minimized and substantially reduced by manipulating or flexing the molded material so as to cause slight relative movement between the strengthening members and the material.

It is to be understood that the invention is not to be confined to the details herein given but may be modified within the scope of the appended claims.

What I claim is:

1. A method of vacuum forming an article of manufacture from moldable sheet material comprising the steps:

(a) providing a mold;

(b) mounting three or more unconnected rigid article strengthening members to said mold in the form of a peripheral frame with each end part of each strengthening member being positioned adjacent the end part of another of the strengthening members, said strengthening members forming a removable portion of the mold;

(c) heating said sheet material until the sheet material is of a pliable mold conforming state and positioning one of said sheet material and mold relative to the other so that said sheet material is draped over said mold and the strengthening members thereof when said material is in its heated mold conforming state;

(d) creating a vacuum between said mold and said heated sheet material to cause said material to conform to the shape of said mold with said strengthening members cooperating with said sheet material to form a part of said article of manufacture;

(e) cooling said mold conforming sheet material to permit a separation of said mold from said sheet material; and (f) separating said mold from said mold conforming sheet material and strengthening members flexing said molded sheet material after its separation from said mold to cause relative movement between said strengthening members at the adjacent end parts thereof and between the strengthening members and the molded sheet material to remove any bowing or similar distortion of the article.

2. The method of claim 1 and including the step of selecting strengthening members and sheet material which are of a suitable composition preventing fusion therebetween during the conforming of said sheet material to said mold and wherein said step of flexing said molded sheet material includes causing relative movement between said molded sheet material and strengthening members.

3. The method of claim 1 wherein the step of mounting said strengthening members to said mold includes locating at least one of said members so that said sheet material when conformed to the mold and later separated therefrom includes portions spaced from said one strengthening member to permit shrinkage of the material about the one strengthening member as said material is further cooled.

References Cited
UNITED STATES PATENTS 3,467,741   9/1969   Kesling _____ 264—92

ROBERT F. WHITE, Primary Examiner

J. H. SILBAUGH, Assistant Examiner

U.S. Cl. X.R.

264—264, 275; 312—214; 425—109, 388